(12) United States Patent
Plath (10) Patent No.: US 7,811,088 B2
(45) Date of Patent: Oct. 12, 2010

(54) LOW-COST MAGNETICALLY AIDED APPARATUS FOR SEPARATING DENTAL AMALGAM FROM WASTE WATER

(76) Inventor: David C. Plath, 3443 NW. Port Ct., Lincoln City, OR (US) 97367

( * ) Notice: Subject to any disclaimer, the term of this patent is extended or adjusted under 35 U.S.C. 154(b) by 238 days.

(21) Appl. No.: 11/586,802

(22) Filed: Oct. 25, 2006

(65) Prior Publication Data

US 2008/0099390 A1    May 1, 2008

(51) Int. Cl.
*A61C 17/06* (2006.01)
(52) U.S. Cl. .................. 433/92; 210/223; 210/416.1; 210/521
(58) Field of Classification Search ............ 210/222, 210/223, 695, 167, 171, 195.1, 241, 255, 210/257.1, 258, 259, 320, 521, 416.1; 209/136, 209/174, 223.1; 433/92
See application file for complete search history.

(56) References Cited

U.S. PATENT DOCUMENTS

| | | | | |
|---|---|---|---|---|
| 937,033 | A * | 10/1909 | Luckenbach ............... 209/181 |
| 1,973,770 | A * | 9/1934 | McCullough ............... 209/14 |
| 1,976,858 | A * | 10/1934 | Ritter ........................... 47/18 |
| 2,257,337 | A | 9/1941 | Grable |
| 3,033,369 | A * | 5/1962 | Kragle ..................... 209/223.1 |
| 3,484,941 | A * | 12/1969 | Svard ......................... 433/92 |
| 3,665,682 | A * | 5/1972 | Ciavattoni et al. ............ 55/337 |
| 3,888,268 | A | 6/1975 | Karpinski |
| 3,903,000 | A * | 9/1975 | Miura et al. ................ 210/251 |
| 4,058,897 | A * | 11/1977 | Edwards ..................... 433/97 |
| 4,097,381 | A * | 6/1978 | Ritzler ....................... 210/259 |
| 4,268,306 | A | 5/1981 | Bjorkman |
| 4,326,952 | A * | 4/1982 | Blake ......................... 210/85 |
| 4,525,270 | A * | 6/1985 | McCann ..................... 209/44 |
| 4,564,374 | A | 1/1986 | Hofmann |
| 4,565,624 | A | 1/1986 | Martinez |
| 4,580,978 | A * | 4/1986 | Motola et al. ................ 433/92 |
| 4,659,457 | A | 4/1987 | Martinez |
| 5,033,332 | A | 7/1991 | Riley |
| 5,044,953 | A * | 9/1991 | Sullivan ..................... 433/92 |
| 5,114,578 | A * | 5/1992 | Sundstrom ................. 210/256 |
| 5,205,414 | A | 4/1993 | Martinez |
| 5,571,408 | A * | 11/1996 | Rising .................... 210/167.29 |
| 5,797,742 | A * | 8/1998 | Fraker ....................... 433/92 |
| 5,885,076 | A | 3/1999 | Ralls et al. |
| 5,927,508 | A | 7/1999 | Plath |
| 6,592,754 | B2 | 7/2003 | Chilibeck |
| 6,784,440 | B2 * | 8/2004 | Fink et al. .................. 250/435 |
| 7,063,793 | B2 | 6/2006 | Albiston et al. |
| 7,074,337 | B2 | 7/2006 | Miller |
| 7,166,214 | B2 * | 1/2007 | Armstrong et al. ......... 210/205 |
| 7,182,599 | B2 * | 2/2007 | Stone et al. ................. 433/92 |
| 2004/0222141 | A1 | 11/2004 | Gray |
| 2005/0016913 | A1 | 1/2005 | Giesel et al. |
| 2005/0034651 | A1 | 2/2005 | Albiston et al. |
| 2006/0065594 | A1 * | 3/2006 | Armstrong et al. ......... 210/606 |

OTHER PUBLICATIONS

McManus, Kevin. Purchasing, installing and operating dental amalgam separators. JADA, vol. 134, Aug. 2003.

\* cited by examiner

*Primary Examiner*—Tony G Soohoo
*Assistant Examiner*—David C Mellon (57) ABSTRACT

A replaceable module for capturing amalgam and mercury from the waste water disposal system of a dental office, in which the waste water flows into a settling chamber, overflows from the settling chamber into a magnetically-assisted sluice, and then after being further cleaned by the sluice, flows on to a sewer connection.

19 Claims, 7 Drawing Sheets

FIG. 6 Section 6-6

LOW-COST MAGNETICALLY AIDED APPARATUS FOR SEPARATING DENTAL AMALGAM FROM WASTE WATER

BACKGROUND

1. Field of the Invention

The field of this invention is the separation of heavy non-magnetic materials from a fluid body, especially as applied to dentistry.

2. Information

In dental offices the grinding and polishing of teeth produces small bits of gold, dental amalgam, and/or other waste materials which are then inputted by a vacuum process into a waste water system. Dental amalgam contains mercury, which is environmentally hazardous. Disposing of the waste water containing the mercury into a municipal sewer system is no longer acceptable in many locales, especially where it is prohibited by law. Reliable separation of the mercury, whether with or without the accompanying waste water, needs to be accomplished so that the mercury can be recovered or else disposed of as hazardous material.

Gold has advantages for dentistry which have long been known. Gold is non-magnetic and has a density of 19.

The so-called silver fillings used in dentistry are more accurately described as amalgam, and are typically made of a mixture of silver and mercury. Silver is non-magnetic and has a density of 10.5. Mercury is non-magnetic and has a density of 13.

When mercury, a liquid metal, is physically mixed with certain other metals it attempts to alloy with them. This reaction between mercury and base metals is called amalgamation, and is a property peculiar to mercury alone. Mercury is able to amalgamate with silver as well as with some other base metals.

Dental amalgam often contains mercury (45 to 50 percent), mixed with an alloy of silver, tin, and copper (50 to 55 percent). Mixing of the silver filling materials is a dangerous process which must be carefully monitored in the dental office. When those materials are first mixed together, and even before the silver filling is placed into the patient's tooth, the materials begin to form an amalgam and to harden. The amalgam is also non-magnetic and typically has a density of about 12.

In dental offices the waste materials derived from a patient's mouth are applied along with waste water to a screen cup that will remove large objects including amalgam. The screen cup may from time to time be removed and replaced at will. The screen cup generally captures a very large portion of the amalgam and other bulky materials.

The dentist and his or her assistants must carefully monitor their working time and utilize it very efficiently. In disposing of a hazardous chemical material it is important to minimize the possibility of error. It is therefore desirable to avoid or minimize procedures that rely upon office staff. A waste disposal process should preferably operate by itself automatically, without the need for any attention by the office staff.

When bits of amalgam enter the dental waste water they do not automatically divide themselves into the individual components from which they were formed. The complete separation of the mercury from silver, silver alloy, and/or other constituents of the amalgam, may require a combination of mechanical, temperature, and/or chemical process steps.

Some bacteria in municipal waste systems are capable of converting the free mercury found in dental amalgam into the organo-mercuric compound methyl mercury. This form of mercury is responsible for birth defects and nervous disorders in people exposed to methyl mercury through their food. That is the reason why disposing of mercury-containing amalgam into a municipal sewer system is no longer considered acceptable. Recovery of the amalgam and mercury at the point of generation is greatly preferable.

The vacuum process used in dental offices starts at the patient's mouth. Water carrying the waste materials is removed by a vacuum system. The vacuum system at its output end generates an intermittent and very forceful water stream, including widely varying amounts of water, dental waste, and air.

Disposal of waste materials collected from dental waste liquid or fluid is typically performed by an outside contractor to whom the task of separating out and recovering the mercury is delegated. The gold and silver contained in the dental waste water can then be refined to provide an economic return for reducing the charges of the disposal contractor. But whether or not the gold and/or silver is refined and reclaimed, it is very important and apparently quite necessary to have a reliable and safe method for recovering the mercury and disposing of it other than to a public sewer.

There are therefore two very important objectives for a dental amalgam disposal system. One important objective is to remove at least a large percentage of the amalgam from the dental waste water or effluent. For that there is an ISO standard prescribed by the International Standards Association. A second and separate important objective is to protect the waste water entering a public sewer system from excessive mercury levels. The Environmental Protection Agency (EPA) is reported to have reduced the level of mercury that is permissible in waste water dumped into the Great Lakes to only twelve parts per trillion. That standard would present a great challenge to the dental profession for the appropriate handling of amalgam disposal.

An article entitled "Purchasing, installing, and operating dental amalgam separators" published in the Journal of the American Dental Association, Vol. 134, August 2003, at Pages 1054 and following, described practices then recommended to the profession for handling and disposing of amalgam.

Centrifugal Concentrators. It has long been known to use centrifugal separators for separating amalgam from dental office waste water. Such separators are efficient for separating out large objects that also have a high specific density. They are limited, however, in their ability to separate out very small objects. Thus, passing the waste water through a succession of centrifugal separators would remove a great deal of material in the first separator, but much less in the second, and probably very little in the third.

Sedimentation systems. An example is the sedimentation system sold under trademark "The AMALGAM COLLECTOR" by R & D Services, Inc. of Seattle, Wash. 98103. In that type of separator the water does not flow continuously through, but instead is captured in the settling chamber. For a small dental office the sedimentation chamber might be large enough to hold all of the waste water generated during one working day. To provide space for the further inflow of waste water the office staff would then need to carefully draw off the excess water, while also avoiding any disturbance of the accumulated heavy waste or sludge. Settling or sedimentation occurs slowly over time, so the drawing off of excess water would normally be done the first thing in the morning after an overnight settling period. Excess water is then often dumped into the sewer system even though its amalgam and mercury content might greatly exceed a recommended safe level. At appropriate times the remaining sludge containing the captured amalgam will be emptied from the container and taken to a refinery or recovery process. Staff persons who are unskilled in the use of the sedimentation equipment may very well make mistakes leading to inadvertent loss of mercury into the public sewer.

Chemical Separation. It is also known to use ionization processes and adsorbent materials to remove amalgam and mercury from the dental waste water. An example is described in U.S. Pat. No. 7,063,793 issued Jun. 20, 2006. Those procedures require a continuous electrical energy supply for their reliable operation, and may also require additional water to be added as a supplement to the normal inflow of dental waste water. Because of the required staff attention this kind of procedure is also subject to a significant possibility of error.

SUMMARY OF THE INVENTION

According to the present invention I provide a new apparatus for use in dental offices for disposal of amalgam. I provide a replaceable module in which the waste water enters a settling chamber where heavy materials are removed by gravity. The water flow does not stop there, but overflows and continues through at least one magnetic sluice to a cleaned water output from which it can be continuously exited to a public sewer. I have modified the magnetic matrix and magnetically aided separation process that were described in my U.S. Pat. No. 5,927,508 issued Jul. 27, 1999 for panning gold, and have adapted it to the needs of dental offices.

My apparatus does not require daily or weekly staff attention; operates without electricity or a need for supplemental water input; accomplishes separation of a very large portion of the amalgam from the waste water; and greatly reduces the level of mercury in the cleaned water that is discharged to public sewer. From time to time the module can be disconnected from the vacuum system and taken to an outside contractor or refinery to complete the safe disposal of the heavy materials that have been retained in the module.

In the presently preferred form of my invention I provide flow controls for the settling chamber to allow the water to be still for a long enough time to capture a large portion of the heavy materials. I also provide an air relief exit port that connects from the settling chamber to the sewer to safely absorb peaks of air pressure that may occasionally result from violent pressure fluctuations in the volatile incoming waste water.

Further according to my invention, the preferred form of the removable module includes a series of four magnetic sluices through which the waste water moves for accomplishing the separation of the amalgam. The magnetic sluices are arranged in cascade, requiring the water to reverse course when moving from one sluice into the next, which provides a unique opportunity for the suspended heavy particles remaining in the water to be captured by each magnetic matrix.

Further according to my invention, my removable and replaceable module is mechanically arranged so that it is compact, minimizing the amount of space it requires, is easy to handle and to transport whether or not partly filled with heavy material, and is easily disassembled for convenient cleaning out of accumulated heavy material.

DETAILED DESCRIPTION

Figure 1:
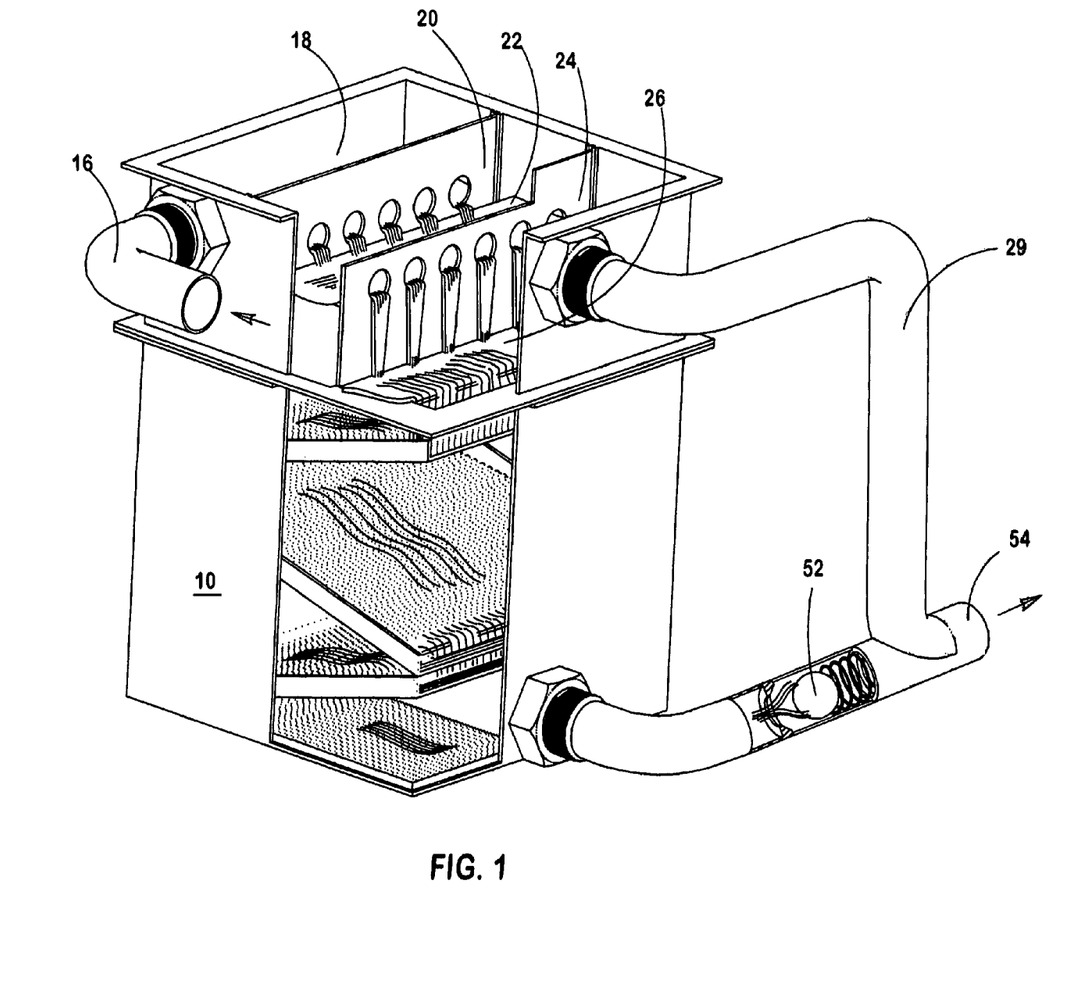
FIG. 1 is a partially cut away perspective view of the presently preferred form of my replaceable module, showing a waste water inlet, an air relief outlet, and a clean water outlet with which an air relief tube joins before exiting to sewer.
Figure 2:
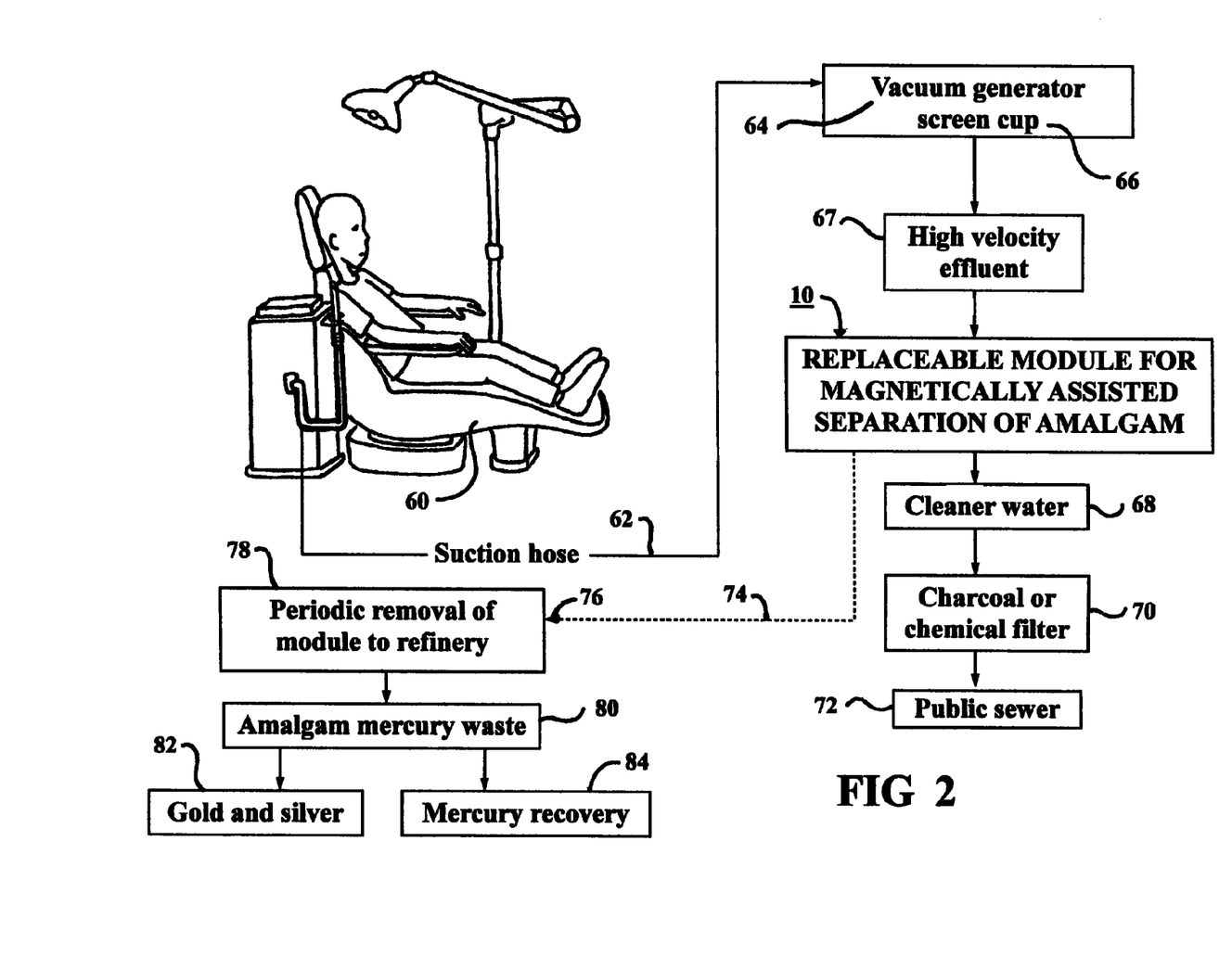
FIG. 2 is a schematic drawing of a dental office waste disposal system in which my magnetically-assisted replaceable module is incorporated.
Figure 3:
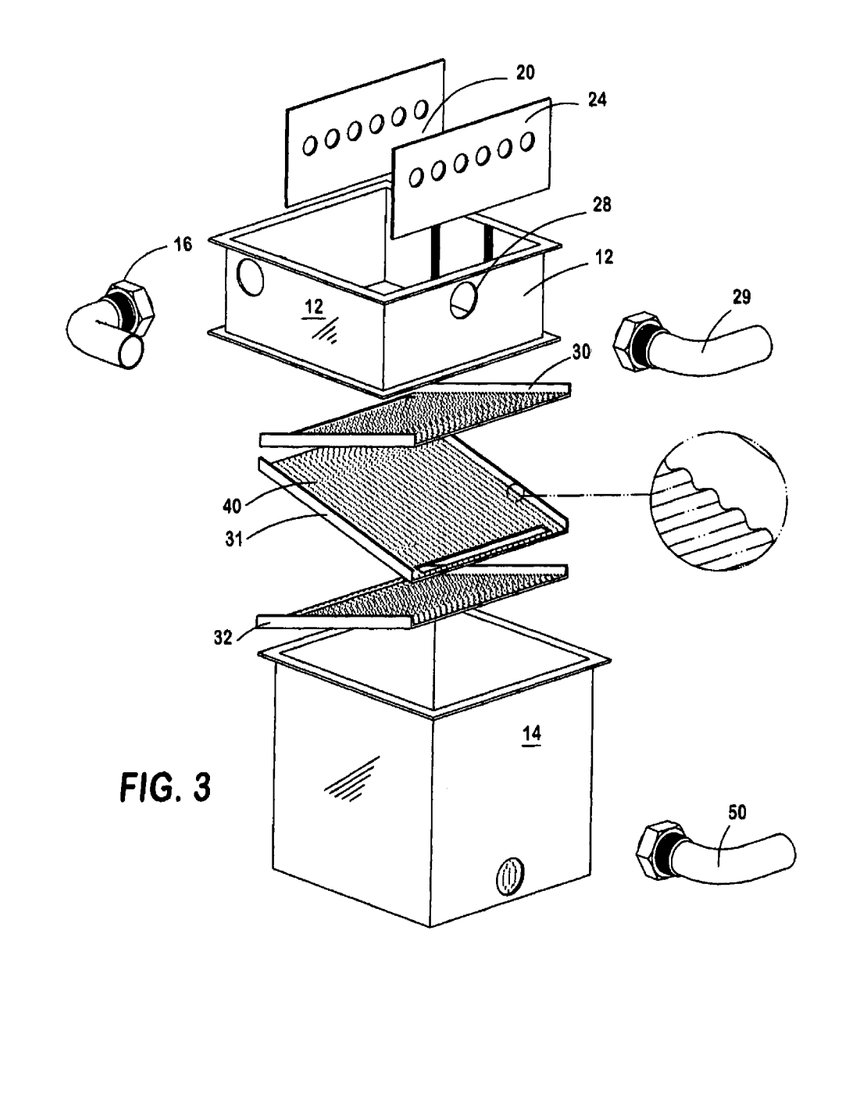
FIG. 3 is an exploded perspective view of my new replaceable module, showing the detachable housing parts and three of the removable magnetic sluices.
Figure 4:
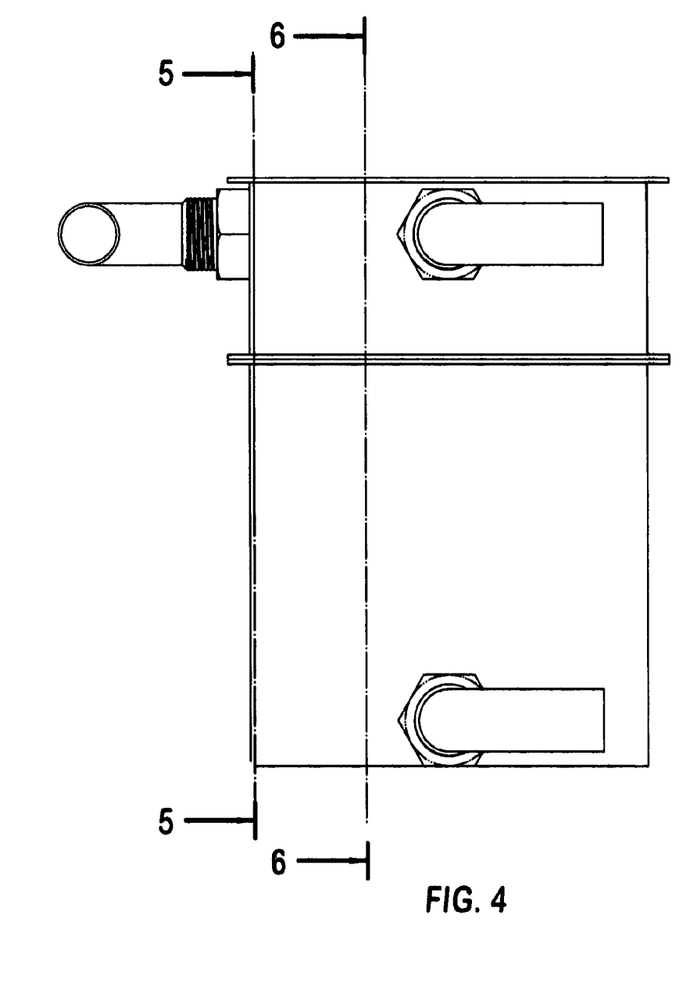
FIG. 4 is an elevation view of the front or output end of my replaceable module.
Figure 5:
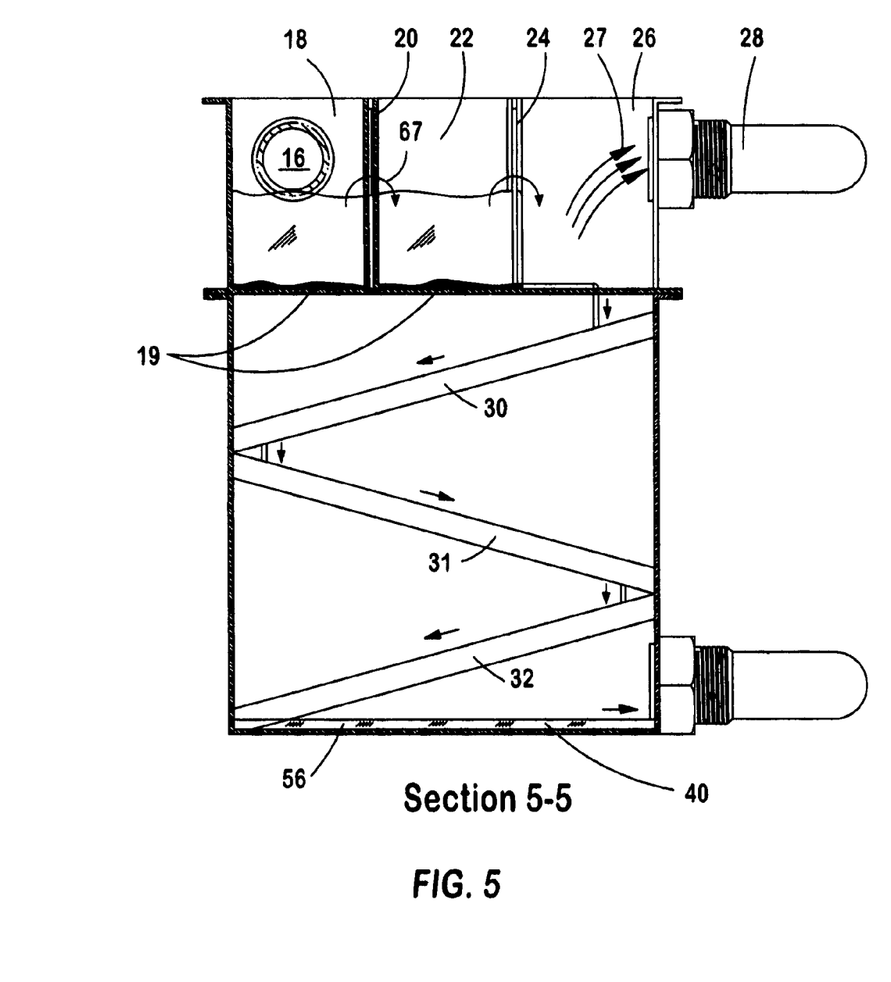
FIG. 5 is a cross-section view of my module showing the internal path for water flow.
Figure 6:
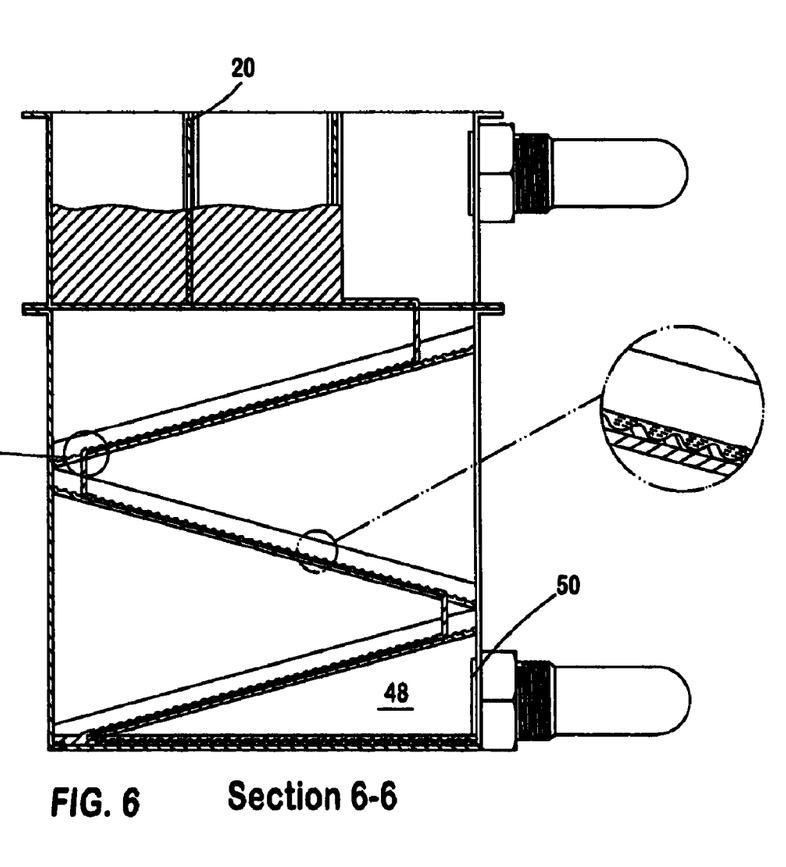
FIG. 6 is a vertical cross-section of my module taken on Line 6-6 of FIG. 4.

Reference is first made to FIG. 2 showing how my magnetically-assisted replaceable module 10 may be incorporated in a dental office waste disposal system. A dental patient is in a chair 60 and is being treated by a dentist. A suction hose 62 is part of a vacuum system 64 that picks up waste water and solid materials from the patient's mouth as the work is being done. This waste water contains, among other things, dental amalgam formed from a mixture of silver and mercury. The vacuum delivers the water through a removable screen cup 66 where larger particles are collected. The effluent then passes through my replaceable module 10 to provide magnetically-aided amalgam separation. Relatively clean water then flows from an output 68 of the separation module direct to a public sewer system 72. The relatively clean water may, alternatively, also pass through a charcoal or chemical filter 70 before reaching a public sewer. A dotted line 74 and arrow 76 indicate that the entire amalgam recovery module 10 is periodically removed from the dental office and taken to a refinery 78 for further processing. The main requirement for further processing at this special facility is to safely separate out and dispose of the hazardous mercury. An output 80 from the refinery box indicates that mercury waste—now separated from the effluent or waste water—is directed to a destination other than public sewer. Other outputs 82 and 84 from box 80 indicate that the refinery may not only provide an output for the recovery of mercury but may also separate and refine silver or gold captured by the module.

Referring now to FIGS. 1 and 3-8, the details of construction and operation of module 10 will now be described. My module 10 has a housing with detachable upper and lower parts 12, 14. Upper housing part 12 has an inlet port 16 through which effluent is fed into an inlet chamber 18, which is a first settling chamber. A first set of baffles 20 separate inlet chamber 18 from a second settling chamber 22. A second set of baffles 24 separate settling chamber 22 from a transfer chamber 26. A passageway for the waste water allows it to overflow from the transfer chamber 26 through four magnetic sluices 40 into an exit chamber 48. An air relief exit port 28 is located in the housing wall of transfer chamber 26 to relieve peaks of air pressure that may result from pressure fluctuations in the incoming waste water.

The baffles 20, 24, control and stabilize the flow of incoming effluent so that in both settling chambers the heavier and more dense particles will become separated by gravity and fall to the bottom, where they are retained until the module is removed to an outside facility 78. Even though the amalgam has a density more than ten times that of water, the settling of the particles suspended in the waste water, particularly the small particles, is a relatively slow process. Reference numeral 19 represents the sludge collected at the bottoms of the settling chambers.

Figure 7:
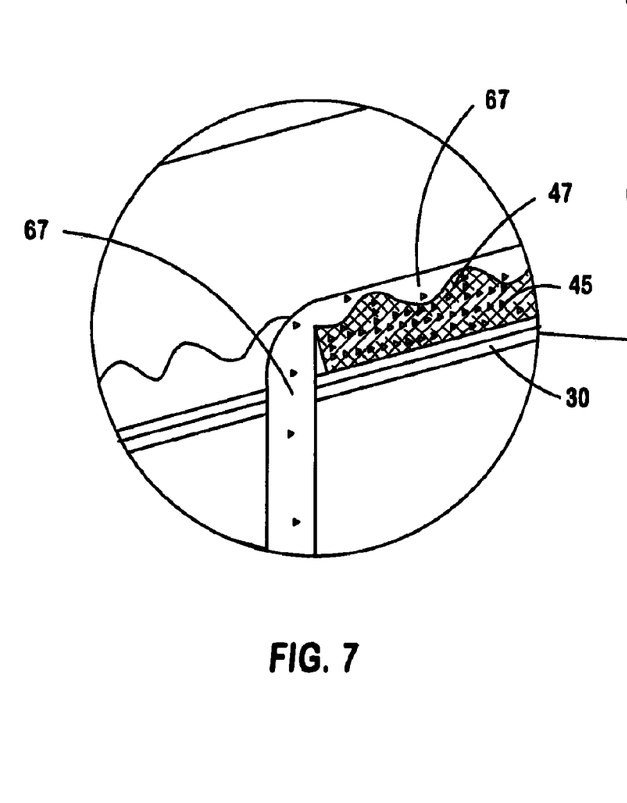
FIG. 7 is an enlarged fragmentary cross-section taken on circle 7 of FIG. 6 and showing a portion of the bed of magnetizable particles in one sluice and the flow of the waste water over it and into the next sluice.

A series of three inclined raceways 30, 31, 32 are supported within housing 12, 14 in a cascaded arrangement beneath the settling chambers 22, 26. Each one of the raceways supports a corresponding magnetic sluice 40. The magnetic sluices are arranged in cascade, requiring the water to reverse course when moving from one sluice into the next, which provides a unique opportunity for the suspended heavy particles remaining in the water to be captured by each magnetic matrix. As shown in FIG. 7, the effluent 67 changes course drastically while flowing from one sluice into the next, providing an opportunity for the suspended particles to settle by density and present themselves to the adsorbing matrix 45 of the next magnetic sluice.

Each one of the raceways supports a corresponding magnetic sluice 40 having a magnetic base member 42 in which a series of longitudinally spaced, transversely extending, magnetic poles 44 are incorporated. A charge or matrix 45 of magnetically susceptible particles 45 is placed above each magnetic base member to form transverse rows 47 of such particles magnetically aligned with the corresponding magnetic poles beneath them in the base member. The magnetic poles 44 and the aligned rows 47 of magnetically susceptible particles are shown in cross-section in FIG. 8. The upper surface 58 of each particle matrix 45 has an essentially sinusoidal cross-sectional shape.

Module 10 in its lower housing part 14 also has a bottom wall 56 upon which a fourth magnetic sluice 40 is supported, adjacent an output port 50. The output port 50 is provided near the lower extremity of the housing so that cleaner waste water 68 after flowing through the magnetic sluices may then continuously flow through a tube 54 to a public sewer 72. An air outlet tube 29 from air relief exit port 28 joins with the tube 54, and a check valve 52 is provided is tube 54 on the inlet side of the junction to prevent air pressure from flowing back into the sluices. The housing can be easily disassembled by detaching the upper housing part 12, for the purpose of removing sludge and heavy materials accumulated in the bottoms of the magnetic sluices.

Figure 8:
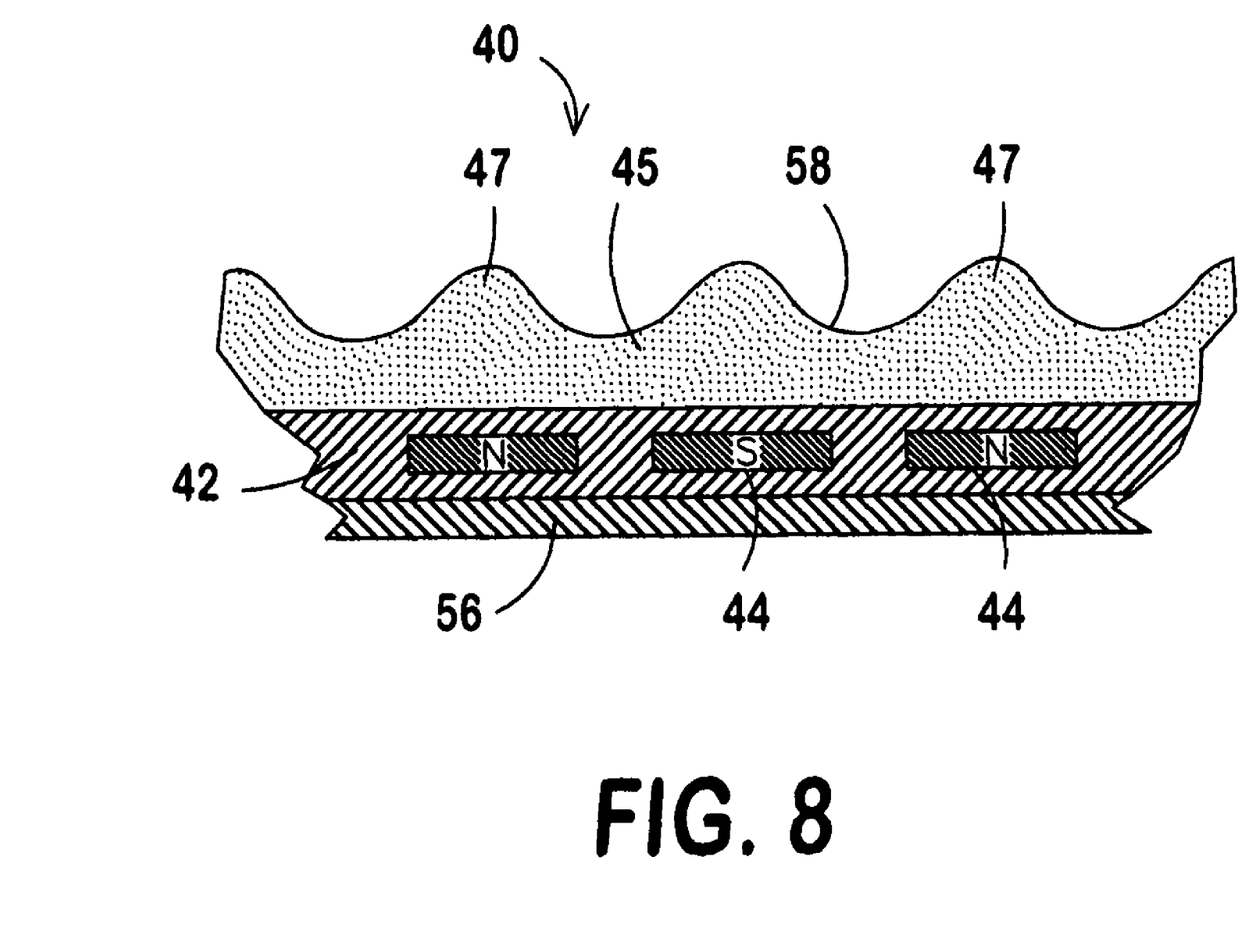
FIG. 8 is a cross-section view showing a typical magnetic sluice construction.

In the construction of each magnetic sluice, as shown in FIG. 8, there are successive magnetic poles 44 extending transverse to the direction of flow of the waste water 67. Above base member 42 the particles of a magnetically susceptible material forming the bed or matrix may be, for example, magnetite. The alternate transverse strips of the base member are preferably magnetized in opposing directions, but satisfactory operating results may also be achieved if the polarities of all are oriented in the same direction.

The use and periodic replacement of the screen cup is a traditional function in a dental office, requiring regular staff attention, and is effective for very large and heavy particles. The settling process in my settling chambers 22, 26, is also reliable for capturing very large particles of amalgam, and does so without any regular staff attention. The settling process is not as reliable for the smaller particles, because they tend to stay in suspension much longer. The ridges or rows 47 of particles in my magnetic matrices facilitate the amalgam separation by engaging and retaining these smaller amalgam particles that are suspended in the waste water flowing above them, which would otherwise float on out to the sewer.

Experimental Results. Earlier configurations of my removable module were installed and operated in the office of a single dentist, without staff attention, and the results of the amalgam separation were studied. The presently preferred embodiment of my removable module was then installed and tested for a full year, again without supplemental water input, use of electricity, or staff attention. The level of removal of amalgam which it achieved met the minimum requirements of the International Standards Organization (ISO), and the level of mercury left in the water emptying to sewer was also significantly reduced.

Alternate forms. The significant features of my invention are that a replaceable module for in-line use in the waste water disposal system of a dental office, utilizing at least one settling chamber followed by at least one magnetic sluice, can be economically operated without electricity, supplemental water input, or regular staff attention. For offices with more than one dentist, other equipment configurations may be desirable, as persons skilled in the art would understand. By employing a greater number of magnetic sluices in series the level of mercury remaining in water exiting to public sewer can be greatly reduced. In other words, even after very small parts of the heavy and dense materials have been removed from the effluent, my magnetic separation process will effectively remove even smaller particles.

Additional alternate form. While my invention also includes the idea of using non-magnetic sluices in combination with one or more settling chambers, that would be of very limited value because the screen cup will effectively remove particles down to a size of about 150 microns, and adding standard sluices of the types now used in mining operations would have very little effectiveness for particles smaller than that.

While the presently preferred embodiment of my invention has been disclosed in detail in order to comply with the requirements of the patent laws, there are possible modifications and alternative forms that would be understood by those persons skilled in the art. The scope of my invention, however, is to be limited only in accordance with the appended claims.

I claim:

1. A dental office separator for removing amalgam and gold from dental waste water, the dental office separator comprising:
    an inlet to admit dental wastewater containing suspended nonmagnetic particles smaller than about 150 microns into the dental office separator, wherein the suspended particles comprise gold and amalgam;
    a dental wastewater suction hose connected to the inlet and to transfer the dental wastewater from a patient's mouth to the inlet, wherein the dental wastewater suction hose comprises a portion of a dental vacuum system;
    a first set of baffles to separate an inlet settling chamber from a second settling chamber to slow the dental wastewater;
    a second set of baffles to separate the second settling chamber from a transfer settling chamber to further slow the dental wastewater; and
    at least one magnetically assisted sluice to receive the further slowed dental wastewater from the transfer settling chamber and through which the dental wastewater flows gravitationally downward to allow the suspended nonmagnetic particles to settle by gravity, wherein the settled suspended nonmagnetic particles are provided to a subsequent magnetically assisted sluice among the at least one magnetically assisted sluice so that the suspended nonmagnetic particles are removed from the dental wastewater, wherein the at least one magnetically assisted sluice comprises:
    a magnetic base member having a plurality of spaced apart magnets, and an adsorbing matrix of magnetically susceptible particles wherein the matrix is aligned by the magnets to form transverse rows of the magnetically susceptible particles in order to remove the suspended nonmagnetic particles from the dental wastewater.

2. The dental office separator of claim 1, further comprising multiple magnetically assisted sluices arranged in cascade.

3. The dental office separator of claim 1, further comprising an air relief exit port adjacent to an output port to relieve peaks of air pressure resulting from pressure fluctuations of the admitted dental wastewater.

4. The dental office separator of claim 1, further comprising a housing capable of disassembly into detachable parts to clean material from the at least one magnetically assisted sluice.

5. The dental office separator of claim 1, wherein a module comprising the first and second set of baffles and the at least one magnetically assisted sluice further includes an output port from which cleaned dental wastewater, after flowing through the at least one magnetically assisted sluice, flows to a public sewer.

6. The dental office separator of claim 1, wherein a module comprising the first and second set of baffles and the at least one magnetically assisted sluice is replaceable.

7. The dental office separator of claim 1, wherein the at least one magnetically assisted sluice is inclined, and wherein consecutive magnetically assisted sluices are oppositely inclined to reverse a flow direction of the dental wastewater.

8. The dental office separator of claim 6, wherein the at least one magnetically assisted sluice is disposed beneath the settling chamber to receive the dental wastewater from the settling chamber.

9. The dental office separator of claim 1, wherein the at least one magnetically assisted sluice includes a series of transversely extending, longitudinally spaced, magnetic poles.

10. The dental office separator of claim 8, wherein the magnetically susceptible particles form transverse rows magnetically aligned with the magnetic poles.

11. The dental office separator of claim 1, wherein the settling chamber includes a passageway to allow the dental wastewater to overflow into the at least one magnetically assisted sluice, and includes an air relief exit port to relieve peaks in air pressure resulting from the admitted dental wastewater.

12. The dental office separator of claim 11, wherein the settling chamber is adapted to receive the admitted dental wastewater that includes a mixture of air and solids.

13. The dental office separator of claim 12, wherein the settling chamber is adapted to receive the admitted dental wastewater during violent pressure fluctuations.

14. The dental office separator of claim 13, wherein the dental wastewater comprises waste water produced in a dental office.

15. The dental office separator of claim 6, wherein the module is operable without supplemental water input.

16. The dental office separator of claim 1, wherein the magnetically susceptible particles comprise magnetite.

17. A dental office device, comprising:
an inlet to admit dental wastewater containing suspended nonmagnetic particles,
a first set of baffles to separate an inlet settling chamber from a second settling chamber to slow the dental wastewater,
a second set of baffles to separate the second settling chamber from a transfer settling chamber to further slow the dental wastewater,
a dental wastewater suction hose connected to the inlet and to transfer the dental wastewater from a patient's mouth to the inlet, wherein the dental wastewater suction hose comprises a portion of a dental vacuum system, and
at least one magnetically assisted sluice to receive the further slowed dental wastewater from the transfer settling chamber and through which the dental wastewater flows gravitationally downward to allow the suspended nonmagnetic particles to settle by gravity, wherein the settled suspended nonmagnetic particles are provided to a subsequent magnetically assisted sluice among the at least one magnetically assisted sluice so that the suspended nonmagnetic particles are removed from the dental wastewater, wherein the at least one magnetically assisted sluice includes a magnetic base member to support magnetite and to form transverse rows of the magnetite particles in order to remove the suspended nonmagnetic particles from the dental wastewater.

18. The device of claim 17, wherein the nonmagnetic particles comprise gold and amalgam.

19. The device of claim 18, wherein the nonmagnetic particles are smaller than about 150 microns.

* * * * *